Feb. 9, 1932.  B. HOWE ET AL  1,844,092
METHOD OF AND MACHINE FOR MAKING FASTENING DEVICES
Filed Aug. 31, 1927   5 Sheets-Sheet 3
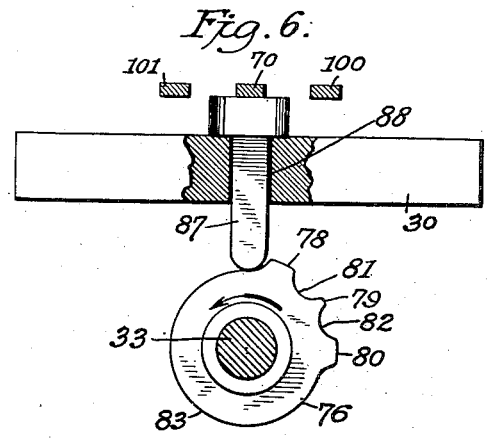
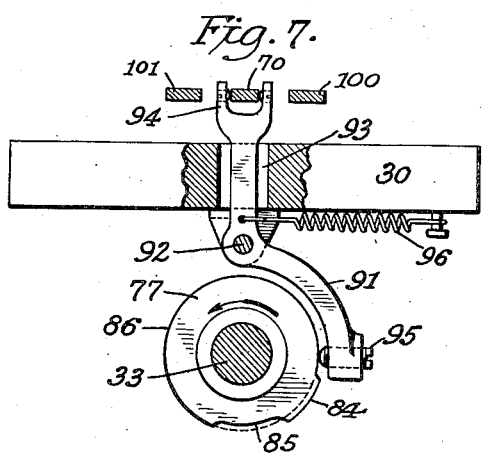
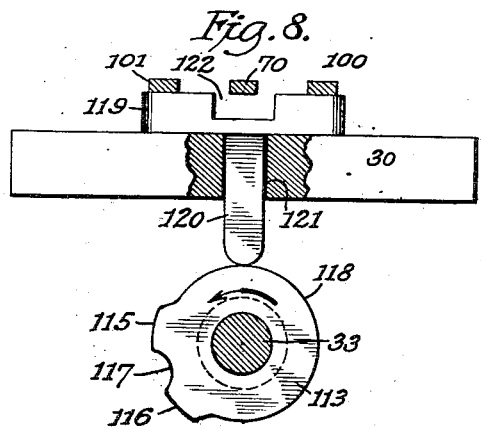
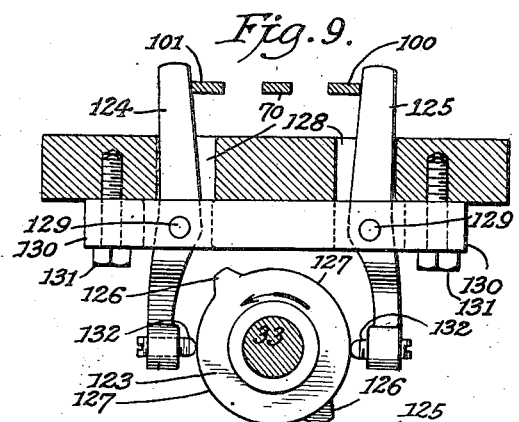
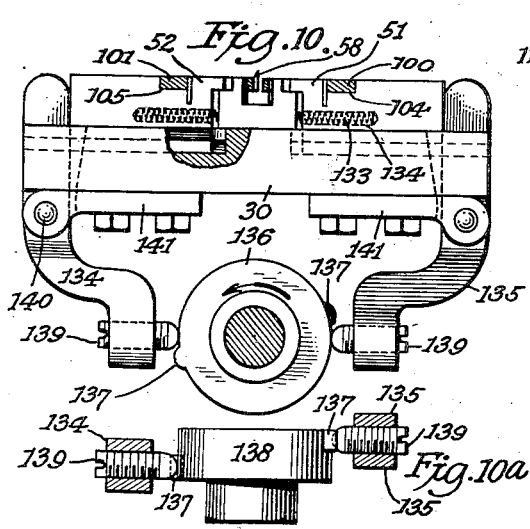
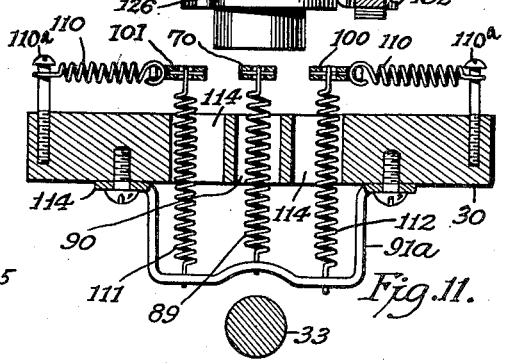
INVENTOR
Ben Howe and
Edward Kunzelman.
BY
ATTORNEY.

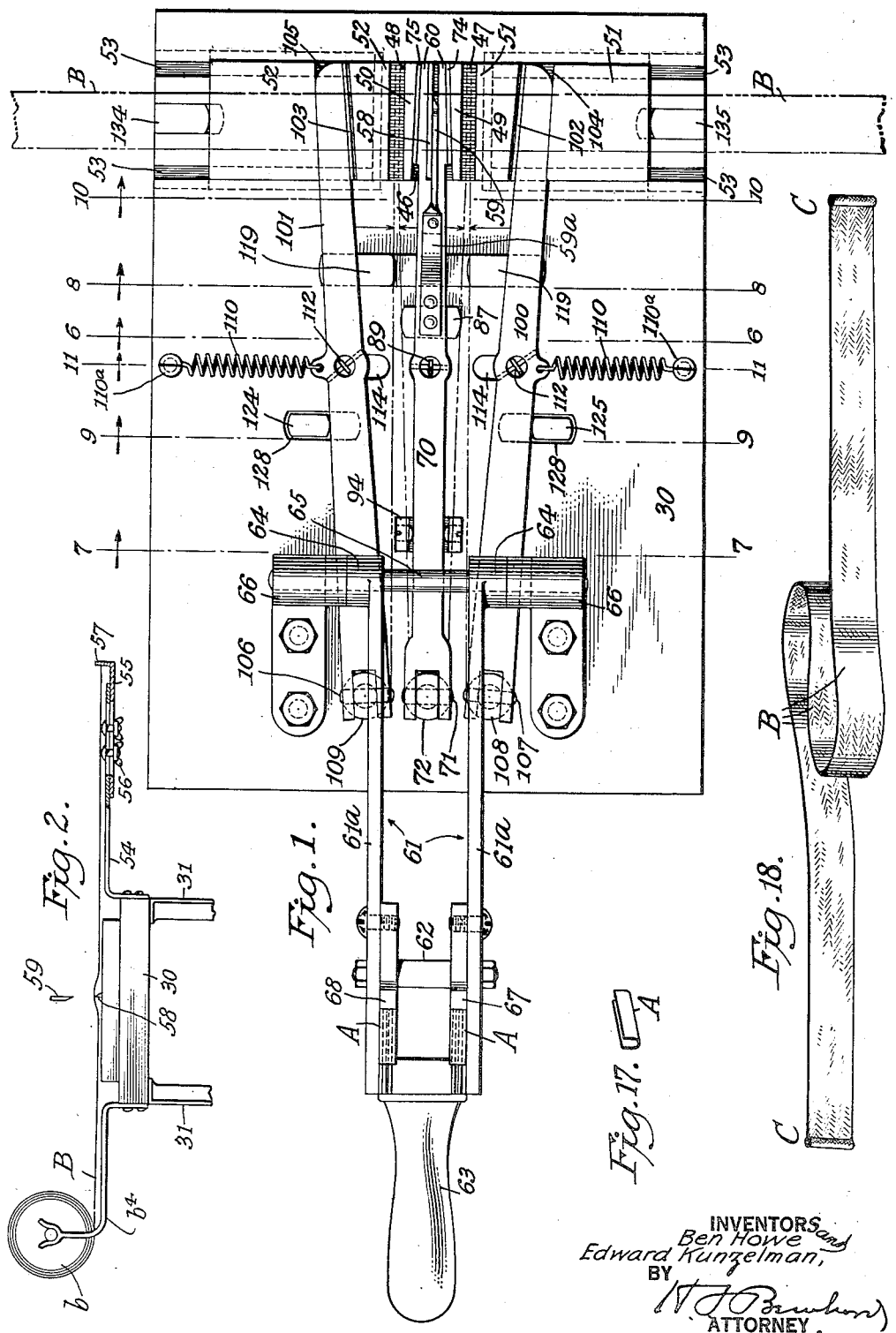

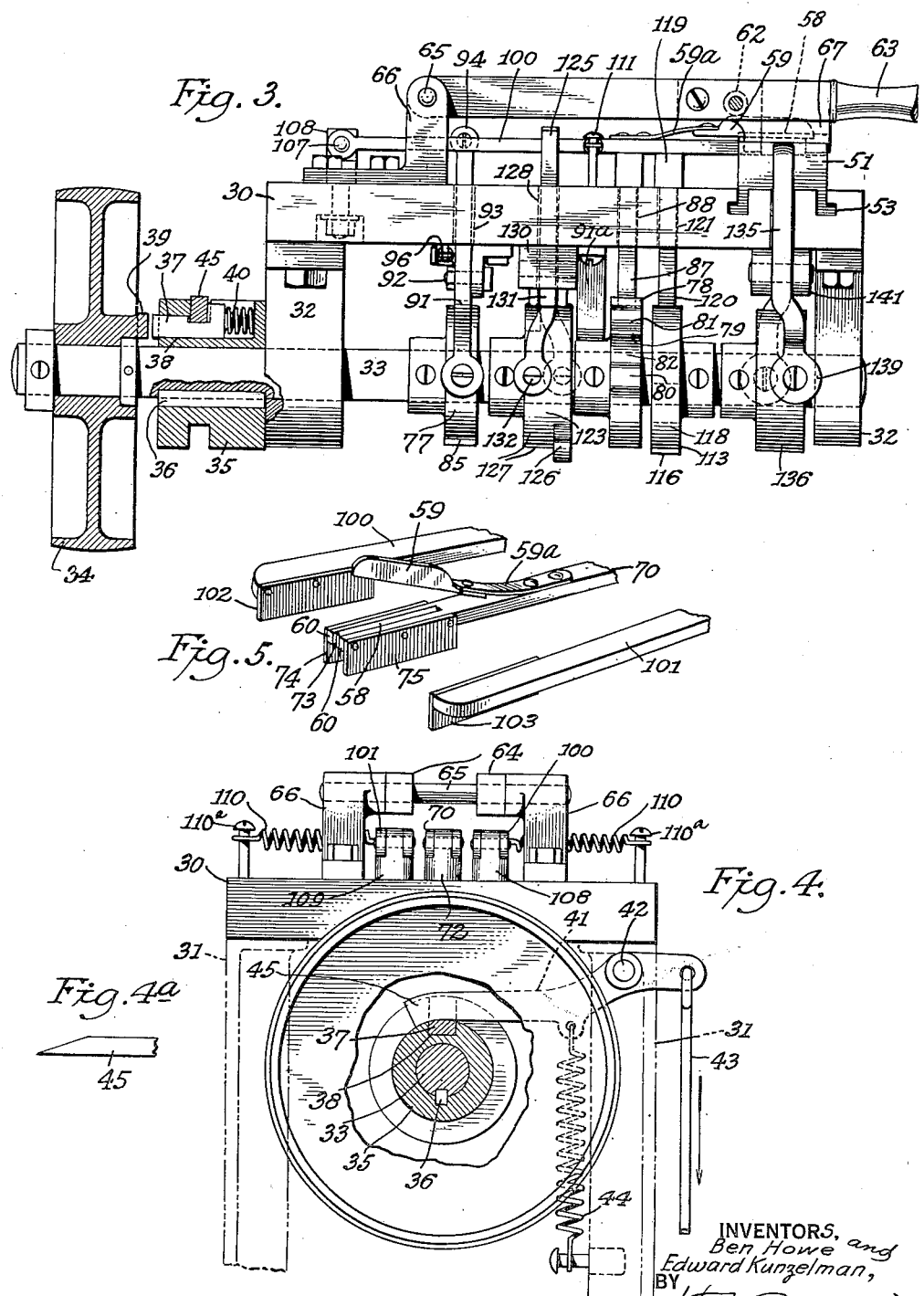

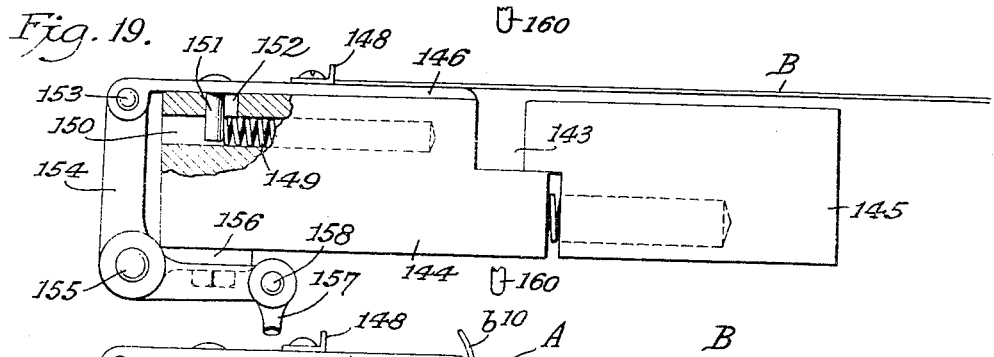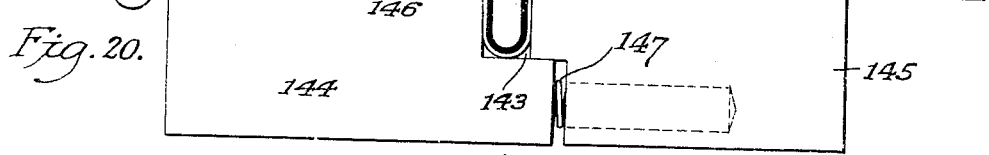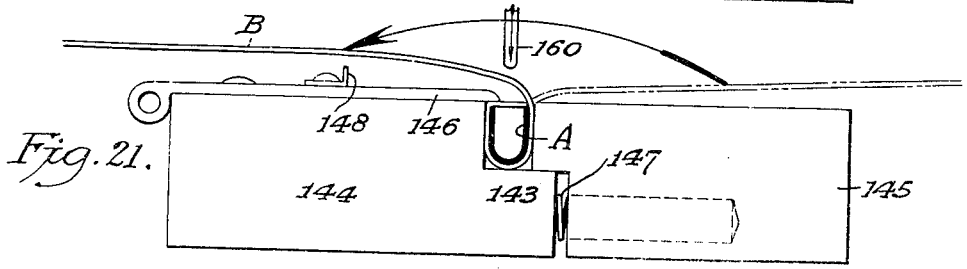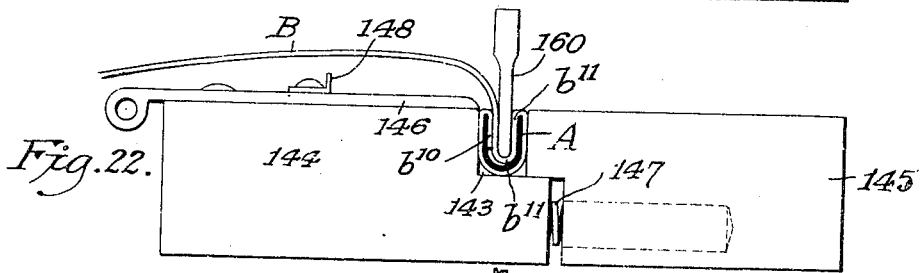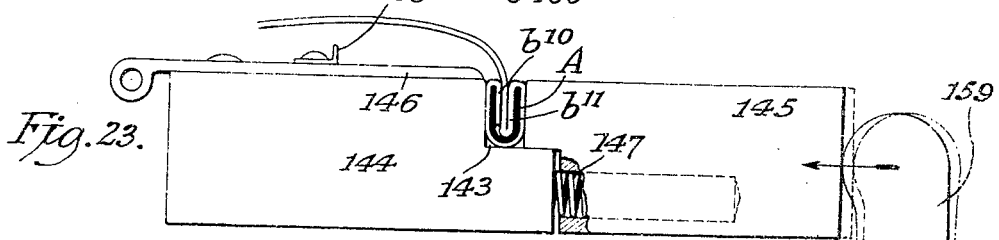

Patented Feb. 9, 1932

1,844,092

UNITED STATES PATENT OFFICE

BEN HOWE, OF BROOKLYN, AND EDWARD KUNZELMAN, OF NEW YORK, N. Y., ASSIGNORS TO A. B. A. SPECIALTIES COMPANY, INC., OF NEW YORK, N. Y., A CORPORATION OF NEW YORK

METHOD OF AND MACHINE FOR MAKING FASTENING DEVICES

Application filed August 31, 1927. Serial No. 216,696.

Our invention is a machine for producing fastenings, and more particularly for the production of fastenings of the character disclosed in an application for a patent filed by Annette Fridolph on October 11, 1926, Serial No. 140,703, (Patent No. 1,667,644, dated April 24, 1928) for fastening means, wherein a length of fibrous material, such as a fabric ribbon or tape, is associated with a metal tip, part or element, in a way to permanently attach the metal and the fabric elements for producing a stiffened end on the fibrous element, whereby the product is adapted for service in conjunction with an opening of one kind or another, and said stiffened end element constitutes with said opening a two-part separable fastening useful for a variety of services, such as a detachable and attachable strap for women's garments, a hose supporter, a glove fastener, and for numerous other usages and purposes.

The object of our invention is to mechanically attach the fibrous part and the metallic part to attain economy, security and precision in the production of the strap member of a separable fastening of the character mentioned, whereby manual labor is minimized to an appreciable extent.

A further object is to mechanically encase the metal part within the fibrous part, and such encasing of the metal by the fibrous material is attended by a tensioning effect on the fibrous material, to the end that the latter material is wrapped tightly around the metal part with a view to not only encasing the metal against exposure but to preclude slackness or looseness in that part of the fibrous material which encases the metal or other stiffening material for the substantially rigid tip constituting one element of the separable fastening.

Our machine is automatic in action, or at least semi-automatic, with respect to the operations of encasing the metal part by the fibrous part and of clenching the metal part upon the fibrous part, the result of which is a permanent union between the metal and fibrous parts and such union of the two parts is effected with precision, certainty and at a desirable speed to thus attain a relatively large output and to effect economy in the manufacture of the fastening.

Broadly stated, our invention embodies means for the assembly of the metal part and of a determined length of fibrous material, means for folding, wrapping or encasing a short section of the fibrous material relatively to the metal part, and means for closing the metal part upon the wrapped section of the fibrous part as by a clenching operation, all of which stages in the procedure follow in a determined sequence and are performed rapidly.

In a practical form of the invention, the assembly means involves a carrier for a metal part, means for determining the position of the fibrous part, and a pocket within which the metal part with a short section of the fibrous part are initially deposited in a manner for the fibrous part to extend around the metal part to partly encase said metal part in the act of assembling the metal and fibrous parts, such assembly stages being semi-automatic, although provision may be made for automatic assemblage.

The encasing of the metal part by the fibrous part is attended by successive operations which are performed automatically, such operations including the step of, first, introducing a free end of the fibrous part within a channeled or grooved metal part, and, second, tucking a portion of the fibrous part within the grooved or channeled metal part, at which second stage the fibrous part is tensioned with respect to the metal part in order to eliminate slack or looseness in that section of the fibrous part which encases the metal part.

The closing means includes as an element thereof the aforesaid pocket adapted for the reception of the fibrous and metal parts, one wall of said pocket being usually fixed and the other wall being movable, together with means for imparting movement to the movable wall in timed relation to the other elements of the machine whereby the pocket walls constitute a press for closing the channeled metal part upon the fibrous material, and thus the two parts (metal and fibrous)

are united by a clenching action to effect their permanent union.

Again, we have embodied the invention in a duplex machine operable for attaching two metal parts to two fibrous parts in such manner that one metal part is clenched on and encased within one fibrous part at one end of the latter. In such duplex machine, there is provided cutting means acting to sever the fibrous material into two pieces each of determined length suitable for the uses intended, and said duplex machine embodies, also, a carrier for two of the metal parts, a plurality of pockets within which are deposited the two metal parts together with appropriate sections of the two fibrous parts, a common means acting to successively infold the free ends of the two fibrous parts within the two channeled metal parts, tucking means for infolding the two fibrous parts within the two metal parts, and closing means co-operable with the two pockets for clenching the two metal parts upon the wrapped fibrous parts.

Other functions and operations of our invention will appear in the following description taken in connection with the drawings, wherein—

Figure 1 is a plan view of the invention embodied in a duplex machine, with the several parts in position for the assemblage of the metal parts with a determined length of fibrous material preliminary to the cutting, folding and clenching operations.

Figure 2 is a diagrammatic view, partly in side elevation and partly in section, showing the mode of determining the fibrous material with respect to the pockets, and of cutting said fibrous material into lengths suitable for the purposes.

Figure 3 is a side elevation, partly in section, looking at the lower or right hand side portion of the machine shown in Figure 1, showing more particularly the cam mechanism by which the folding and tucking mechanisms and the clenching mechanisms are actuated in a determined sequence of operations.

Figure 4 is an end view of the machine, looking at the left hand end of Figure 3, parts of the one-revolution clutch mechanism for the drive shaft being shown in section.

Figure 12:
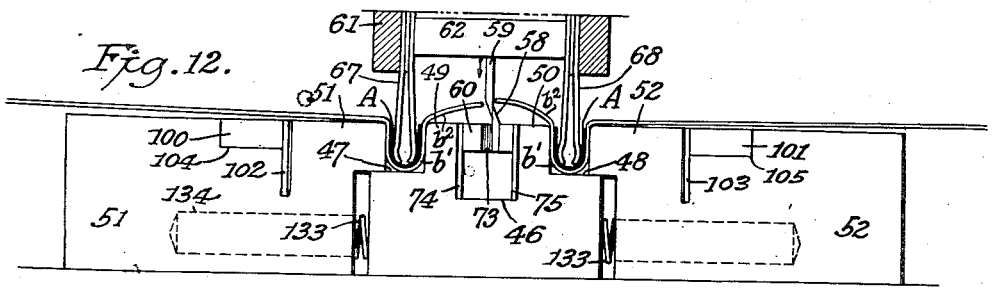

Figure 4ᵃ is a detail fragmentary view of the release or trip member for the one-revolution clutch of Figures 3 and 4.

Figure 5 is a perspective view of the plurality of folding and tucking devices together with a cutter, there being two tucking members (one for each pocket in a duplex machine), and one folding device, the latter being operable with reference to the two pockets.

Figure 6 is a vertical cross section on the line 6—6 of Figure 1 looking in the direction of the arrow, illustrating the cam mechanism for effecting the vertical movement of folding member by which the free ends of two fibrous parts are thrust into the channeled metal parts at successive stages.

Figure 7 is a vertical cross section on the line 7—7 of Figure 1 looking in the direction of the arrow, illustrating the cam mechanism acting to impart horizontal or lateral movement back and forth to the folding member so as to adapt the latter for service one after the other in connection with the two pockets and the two metal parts and the two fibrous parts.

Figure 8 is a cross section on the line 8—8 of Figure 1 looking in the direction of the arrow, illustrating the cam mechanism by which vertical movement is given simultaneously to a plurality of tucking members, the latter being operable in conjunction with the two pockets.

Figure 9 is a vertical cross section on the line 9—9 of Figure 1, looking in the direction of the arrow, illustrating the cam mechanism for the actuation laterally of the two tucking members.

Figure 9ᵃ is a detail view of the cam shown in Figure 9.

Figure 10 is a vertical cross section on the line 10—10 of Figure 1, looking in the direction of the arrow, showing the cam mechanism for the simultaneous operation of the clenching mechanisms, whereby the metal parts are closed upon the fibrous parts.

Figure 10ᵃ is a detail of the cam shown in Figure 10.

Figure 11 is a vertical cross section on the line 11—11 of Figure 1, looking in the direction of the arrow, illustrating an arrangement of spring mechanisms whereby the folding member and the tucking members are pulled downwardly into service positions, and showing also a plurality of springs for the lateral actuation of the two tucking members.

Figures 12, 13, 14, 15 and 16 are views in elevation of the mechanisms and show diagrammatically the sequence of operations of assembling the metal and fibrous parts, the infolding of the fibrous ends within the metal parts, the tucking of the fibrous parts within the metal parts, and the clenching of the metal parts upon the infolded and tucked fibrous parts.

Figure 17 is a perspective view of a channeled metal part adapted to be assembled with a length of fibrous material and to be attached permanently thereto and to be encased therein by the operation of the machine of this invention.

Figure 18 is a perspective view of a length of fibrous material the opposite ends of which are stiffened by tabs constituted in part by channeled parts such as shown in Figure 17 and in part by the fibrous material in encasing and clenched relation to channeled metal parts.

Figures 19, 20, 21, 22 and 23 are views in side elevation of another machine constituting a simpler form of our invention and showing diagrammatically the several operations employed for the assemblage, folding, tucking and clenching of the fibrous part and the metal part in the production of the strap element of a separable fastener.

Before proceeding to a detailed description of the machine, two forms of which are shown, it is desired to call attention to Figures 17 and 18 illustrating, respectively, a metal clip, A, and a fibrous material, B, which are assembled, folded, tucked and united to produce a strap, B, with a stiffened end or ends constituting a tip, C, or tips, C, C, (one or more), wherein the metal clip A is encased by wrapping a portion of the fibrous part B around the metal part A, and by folding and tucking a portion of the fibrous material within the metal part, and thereafter closing the metal part by a clenching operation so as to permanently unite the metal part and the fibrous part in a manner to tension the fibrous part relatively to the metal part for the function of taking up slack in the fibrous part and to tightly encase the metal part within the wrapping or encasing section of the fibrous part, the effect of which is to preclude dislodgment of the metal part or of the fibrous part relatively one to the other whereby the strain or pull on the fastener or the folding of the fibrous part has no apparent effect upon either of said parts, and thus the device remains intact and unaffected by the service, however prolonged and severe such service may happen to be, nor are the parts (metal or fabric) affected by the requirements of the laundry service, nor is the metal part exposed for contact with the flesh of the wearer, nor does the stiffened tab present an unsightly or bulky appearance objectionable to the wearer.

Referring now to the machine of Figures 1 to 11, inclusive, the operation of which is indicated diagrammatically in Figures 12 to 16, both inclusive, the various working parts are supported on a bed or table 30, raised a suitable height by an underframe 31, and from this bed or table depends suitable hangers 32, having bearings in which is mounted a drive shaft 33, the latter being equipped with the several cams for the operation of the folding, tucking and clenching mechanisms in the required sequence of operations. Mounted loosely on said shaft 33 is a driving pulley 34 (Figures 3 and 4), engageable by a belt to which motion is imparted from a motor or line shaft (not shown). Co-operable with the shaft and the pulley is a one-revolution clutch of any desired character, but as shown herein, this clutch embodies a hub 35, keyed at 36 to the shaft, and a slidable member 37, the latter being movable back and forth in a guideway 38, provided in the clutch hub 35. The clutch member 37 is engageable with a stud 39 on the pulley hub (Figure 3), and said member is actuated by a spring 40 to impel said member 37 into engagement with the stud 39, thus making said pulley fast with shaft 33, and said spring operating to retain the clutch member 37 into said engagement with the pulley for a period of time required for the pulley to turn the shaft and make one complete revolution, following which the clutch acts automatically to disengage the pulley from the shaft, causing the working parts to come to rest. In the form shown, this action is obtained by a starting and stopping means embodying a lever 41, fulcrumed at 42 on frame 31, and operable by a link 43 leading to a treadle or lever (not shown), whereby the attendant or operator is enabled to start the machine into service for automatic operation. An arm of said lever 41 extends over and rides upon the clutch hub, upon which the arm is forcibly held by the tension of a spring 44 attached to the lever arm 41 and anchored on the frame (see Figure 4), and this lever 41 is provided with a laterally extending finger 45 (see Figure 4$^a$ and dotted lines in Figure 4), which is tapered to the wedge form shown, so that as the clutch, the pulley and the slidable member 37 reach the limit of motion in the one revolution of the shaft and the related parts, said finger 45 slides into contact with one edge of clutch member 37 and by reason of its wedge shape, said finger 45 acts to force the member 37 backwardly against the tension of spring 40, disengaging the clutch member from pulley stud 39, the parts coming to rest on the completion of one revolution.

Near one side, the bed or table 30 is constructed with a recess 46, and a plurality of die pockets or cavities 47, 48, shown more clearly in Figures 12 to 16, inclusive, said recess 46 being between the die pockets or cavities 47, 48. The recess 46 is bounded in part by walls constituting the fixed jaws 49, 50, of a plurality of press devices or clenching devices the movable jaws 51, 52, of which are co-operable with the fixed jaws 49, 50, for the performance of the operation of closing the metal parts A upon the folded, tucked and wrapped end portions of the fabric members B. As shown, the jaws 49, 51, constitute the boundary walls of the pocket or die cavity 47, whereas the jaws 50, 52, constitute the boundary walls of the other pocket or die cavity 48. Said movable jaws 51, 52, are of block-like formation, and substantially constructed in order to apply the force required for the compression of the metal parts A, A, within the pockets or die cavities, and said jaws 51, 52, are fitted for sliding movement in appropriate guideways 53 (Figures 1 and 3) provided in the bed or table 30. As shown, the guideways 53 are formed in the bed at right angles to the length of the pockets or die cavities and at opposite sides of said pockets, and these guideways extend from the pockets to the outer edges of the bed, allowing the sliding jaws or dies 51, 52, to be introduced into and withdrawn from, the bed 30 as may be required.

Suitable means are provided for gaging the length of the fibrous part B required each time the machine is operated, and for determining with accuracy the position of said length with respect to the recess 46 and the die cavities or pockets 47, 48. The fibrous part B is in roll form (indicated at $b$ in Figure 2), and is mounted in a desirable way for free rotation, as e. g. in a bracket $b^4$, whereby the operator may draw or pull the fibrous part off the roll, and in the course of this operation, the fibrous part B is laid by hand across the recess 46 and the pockets 47, 48 (see Figure 2). To determine the length of the fibrous part of this initial stage, a suitable gage is employed, said gage being shown in Figure 2 as extending outwardly from the bed 30 on the opposite side from the roll $b$, and one form of gage suitable for the purpose being shown as comprising the members 54, 55, fastened together by thumbscrews 56 for extensibly adjusting the gage, whereby the gage lip 57 may be shifted to variable distances with respect to the recess 46 for measuring with accuracy the length of the fibrous part.

In the duplex machine, the length of the fibrous part is severed intermediate its ends to produce two pieces of material being of a length appropriate for use as the resulting product, such as a shoulder strap, and such cutting of the measured length being performed after the fibrous material shall have been positioned initially across the recess 46 and the die cavities or pockets 47, 48. The cutting mechanism in one practical form is shown as a stationary cutter 58 and a movable cutter 59 adapted for shearing relation. The stationary cutter 58 is a blade positioned lengthwise within the recess 46 and supported in an operative position therein by a plate 60, or its equivalent, suitably secured within the recess. The movable cutter 59 is a blade, desirably attached to a cam-actuated member hereinafter described.

Member 61 is a hand lever constituting one part of the assembly means and operable for the reception of a plurality of the metal parts A, A, and for positioning said metal parts within the pockets or die cavities 47, 48, respectively, one in each pocket.

Said lever 61 is is shown in Figure 1 as comprising a plurality of parallel bars $61^a$ united near one end by a through bolt 62 and provided at its free end with a hand grip 63. At the other end of the hand lever, the bars $61^a$ thereof are provided with collars 64 which are sleeved loosely on a horizontal rod or arbor 65 supported in a raised position above the bed 30 by short posts 66 fast with said bed between the side edges thereof and near one end of the same, see Figures 1, 3 and 4. The hand lever 61 is movable by hand on a horizontal axis afforded by the arbor 65, and said lever is operable by the attendant to swing it to an out-of-service position shown in Figure 1, or to a service position over the pockets 47, 48, and the recess 46, shown in Figure 3. Said hand lever 61 is equipped with a plurality of carriers for a like number of metal parts A, two carriers being shown at 67, 68 (Figures 1, 3 and 12), each carrier being in the form of an expansible clip divided for spring action, and over which the metal part A is adapted to be slipped by hand so that the spring clip will have such frictional engagement with the channeled part A for retaining said part A upon the clip in the operation of moving the hand lever from the out-of-service position of Figure 1 to the service position indicated in Figure 12. The hand lever and the frictional retainers 67, 68, are so related to the pockets or cavities 47, 48, that in the service position of the hand lever 61 the spring retainers 67, 68, will present the two metal parts A, A, to said pockets 47, 48, and thus the hand lever and the retainers are effective in the operation of introducing the metal parts A, A, into the pockets 47, 48, respectively, see Figure 12.

It will be noted that in the out-of-service position of the hand lever, it is turned to present the retainers 67, 68, to face upwardly, as in Figure 1, thus enabling the operator to load two channelled parts A, A, upon said retainers, but upon swinging the hand lever upwardly and forwardly, it is reversed in position over the pockets 47, 48, in order to enter the metal parts A, A, into said pockets, as in Figures 3 and 12.

In the operation of the hand lever 61 in a direction to assemble the metal parts A, A, with respect to the pockets or cavities 47, 48, the metal parts A, A, on the spring retainers 67, 68, are pressed downwardly upon the piece of fibrous material, B, which, previously to the stated movement of lever 61 with said metal parts A, A has been stretched by the operator across the pockets 47, 48, and the recess 46. Now upon the final stage in the movement of the hand lever for thrusting the metal parts A, A, into the pockets, said metal parts and the retainers 67, 68, apply pressure to the fibrous material, with the result that short lengths of said fibrous material are carried by the metal parts into the pockets 47, 48, as indicated at $b'$, $b'$, in Figure 12, the effect of which is to exteriorly encase the metal parts A, A, with said fibrous material. Simultaneously with the pressing down of the metal parts with the fibrous material $b'$ into the pockets or cavities 47, 48, the length of fibrous material is severed or cut transversely by the coacting knives 58, 59, see Figure 12, whereupon the hand lever 61 is reversed by the operator, thus withdrawing the spring retainers 67, 68, from the pockets and the metal parts, leaving said metal parts with the fibrous material within said pockets or cavities, it being noted by reference to Figures 12 and 13 that there are two free ends $b^2$, $b^2$, of the two lengths of fibrous material in a loose or unconfined relation to the metal parts A, A. At this stage in the cycle of operations, the action of the machine becomes automatic insofar as concerns the operations of thrusting the free ends $b^2$, $b^2$, of the two pieces of fibrous material into the channels of the respective metal parts A, A, contained for the time in the pockets 47, 48, thereafter some of the fibrous material is tucked within the channels of said metal parts (Figure 15) so as to draw the fibrous materials tightly around the metal parts, and finally the metal parts A, A, are compressed by a clenching operation (Figure 16) to effect the permanent union of the two metal parts with the ends of the respective lengths of fibrous material B.

Figure 13:
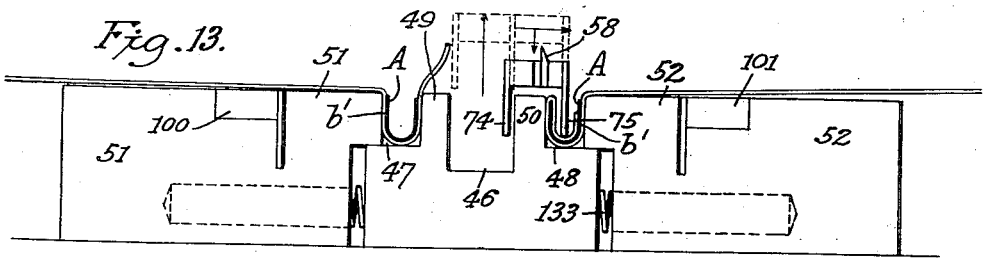
Figure 14:
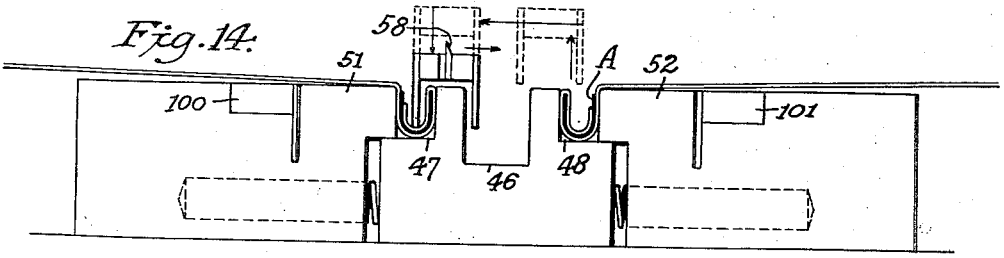

The automatic means for infolding the free ends $b^2$, $b^2$, of the lengths B, B, of fibrous material within the channeled metal parts A, A, include a lever 70 (Figures 1, 5, 6, 7, 8, 9, 13 and 14), occupying a horizontal position above the table or bed 30 and capable under the action of certain cams of a compound movement in order to sweep over the pockets 47, 48, and to enter said pockets so as to press said fibrous ends $b^2$, $b^2$, within the channels of said metal parts A, A (Figures 13 and 14). At one end, lever 70 is hung by a pin 71 to the upper end portion of a short post 72 supported in the bed or table 30 for rocking or turning movement, the pin 71 affording a horizontal axis for the vertical (up and down) motion of the lever 70, whereas the rockable or turnable post 72 affords a vertical axis for the lateral (horizontal) movement of said lever 70. The lever 70 extends below the arbor 65 on which is hung the hand lever 61, and at its free end the lever 70 is slotted or forked at 73 (Figure 5), so that in the downward movement of the lever the stationary knife 58 will be received in said slot when the free end of the lever 70 enters into the recess 46 of the table. Said lever 70 is provided, also, with a plurality of folding blades 74, 75, shown in Figure 5 as flat plates fixedly attached to the lever at the respective sides thereof, said folding blades being parallel to each other and to the slot 73 and said blades depending for desirable distances below the lever 70.

The cutter or knife 59 is carried by the lever 70, for movement therewith, but this movable knife is mounted yieldably on the lever 70, a leaf spring 59$^a$ being shown in Figure 5 as attached to the cutter 59 and the lever 70, whereby the cutter is mounted or supported in an overhanging relation to the slotted end 73 of lever 70. The movable blade 59 is adapted for co-operation with the fixed knife 58 when the hand lever 61 is pressed downwardly to the service position of Figures 3 and 12, said lever having a part, as the bolt 62, adapted for engagement with the movable blade 59 (see Figure 3), so that as the hand lever is moved to deposit the metal parts A, A, into the pockets 47, 48, said lever or its bolt 62 contacts with the yieldably mounted knife 59 and depresses the latter toward the fixed knife 58, and thus the blades 58, 59, have a shearing relation for cutting the fibrous material into pieces of appropriate length (see Figures 2, 12 and 13).

For giving the compound movement to the lever 70, two cams 76, 77, are provided (Figures 6 and 7), both fast with the drive shaft 33, and said cams acting conjointly for the one cam 76 to raise and lower the lever 70 in timed relation to the other cam 77 which imparts the lateral motion to the lever 70. The two cams 76, 77, are appropriately fashioned to perform the functions demanded by the service, but as shown in Figure 6, the cam 76 is formed with a plurality of high points 78, 79, 80, with corresponding low points 81, 82, and a neutral surface 83 functioning as a period of rest or dwell. The other cam 77 is formed with a rib 84, and a depression 85, the one beyond, and the other within, the neutral surface 86 functioning as a period of rest or dwell (see Figure 7). The lifting cam 76 acts on lever 70 through a finger 87 attached fixedly to the lever and depending therefrom, Figure 6, said finger being movable freely in a slot 88 provided in the table 30 and the lower end of said finger being rounded for contact with the peripheral edge of the cam 76 so as to ride upon the high points 78, 79, 80, and to ride into the low points 81, 82, and upon the neutral edge 83 as the cam rotates with shaft 33, whereby in the one revolution of the shaft the lever 70 is raised and lowered a number of times by the cam for the performance of the service required. The lever 70 is raised with a positive motion by the cam 76, but the down motion of the lever is due to the action of a spring 89 (Figure 11), the latter being attached to said lever 70 to have depending relation thereto, and said spring passing downwardly through a slot 90 in the table. The lower end of the spring is attached to a yoke 91$^a$ (Figure 11) fixed to the underside of the table 30. The cam 77 imparts lateral movement in a horizontal plane to the lever 70, and said cam acts on said lever through the medium of a substantially bell crank lever 91 (Figure 7), the same being pivoted intermediate its ends by a pivotal bolt 92 supported on the underside of the table or bed. The lever 91 is vertically positioned for operation in a slot 93 provided in the table, and at the upper end the lever is forked at 94 to loosely embrace the lever 70, whereas at the lower end, said lever 91 is provided with a contact screw or stud 95 positioned for peripheral contact with cam 77, so as to ride upon the high spot 84, the low point 85, and the neutral surface 86, Figure 7. The lever 91 is moved positively by the action of cam 77 and it is under the tension of spring 96 attached to the lever and anchored on the bed or table at the underside thereof.

With the shaft 33 at rest, and with the cams in the positions of Figures 6 and 7, the lever 70 is drawn down by the spring 89 to occupy the recess 46, with the folding blades 74, 75, depressed into the recess, and with the stationary cutter 58 projecting upwardly through the slot 73, Figure 12, and with the movable cutter 59 held in a raised position above the slot 73 and cutter blade 58 so that the operator is enabled to position the fibrous material B across and above the recess 46 and the cavities 47, 48. The hand lever 61 in the out-of-service position of Figure 1 is loaded with two of the channeled metal parts A, A, and at the required time this lever is moved by hand into the service position indicated in Figure 12, with the result that the channeled parts A, A, are introduced into the pockets 47, 48, and the fibrous parts are pressed downward at $b'$ into the pockets 47, 48, and the cutters 58, 59, coact to cut the fibrous material into two pieces, leaving free the ends $b^2$ of said pieces of fibrous material. It is at this stage that the cams 76, 77, begin to act, the same being brought into service by the operator depressing the treadle to pull downward on the link 43 and to withdraw the member 45 of the clutch lever 41 from clutch member 37, allowing the spring 40 to act on said clutch member 37, and to press it into engagement with stud 39 of pulley 34, making the latter fast with the shaft 33. The lever 61 having been lifted out of the way, the shaft 33 imparts motion to the cams 76, 77; and as the cams begin to turn, the lever 70 is first raised, then shifted toward the right in Figures 7 and 13 over the pocket 48, then the lever is depressed for blade 75 to enter pocket 48, then the lever is raised, then swung to the left in Figures 7 and 14, to a position over the other pocket 47, then the lever is depressed for blade 74 to enter the pocket 47, then raised out of the pocket 47 and swung toward the right to the neutral position over the recess 46, and then the lever is returned by a downward movement to enter said recess. The function of the lever 70 and its blade 75 on the movement toward the right and downwardly into the pocket 48, shown by full lines in Figure 13, is to fold inwardly the free end $b^2$ of one length of the fibrous material, thus folding said end $b^2$ within the channel of metal part A occupying said pocket 48. The lever 70 and its blade 74 performs a similar function with respect to the free end $b^2$ of the material and to the metal part A occupying the other pocket 47, and it will be noted that as the lever 70 and blade 74 sweep across from pocket 48 toward the pocket 47, (from the full line position of Figure 13 to the dotted and full line positions of Figure 14) the blade 74 sweeps the free end $b^2$ of the fibrous material into the channel of metal part A within said pocket 47. It will thus be seen that the lever 70 and its blades 74, 75, act to first fold inwardly the free end of one piece of fibrous material into the one channeled part A of pocket 48, and thereafter to fold inwardly the free end of the other piece of fibrous material into the channel of the other metal part A occupying pocket 47, the infolding in each instance being obtained by the lateral sweep over and the down motion of the blade into one of the pockets, in order to force said free end into the channeled part. The one lever 70 thus coacts with the two pockets 47, 48, under the timed action of the two cams 76, 77, and the blades 74, 75, have lateral sweeping motions relative to the pockets 47, 48, respectively, as well as downward movements into the said pockets, respectively, with the result that the free ends of the two pieces of fibrous material are encased or housed within the two channeled parts A, A, by mechanism automatic in action.

Means are provided for tucking the pieces of fibrous materials within the channeled parts A, A, subsequently to the operation of encasing said channeled parts by the fibrous materials as heretofore described, and in the performance of the tucking mentioned, the fibrous materials are tensioned around the channeled parts to the end that looseness in said materials is taken up and the channeled parts are encased tightly by the wrapping portions of the fibrous materials. The tucking devices are in duplicate and include levers 100, 101, provided with tucking blades 102, 103, respectively, together with cams and springs for the automatic operation of said tucking levers. As shown in Figure 1, the tucking levers are horizontally positioned above the bed and on opposite sides of the folding lever 70, so that the free ends of the tucking levers 100, 101, are adapted for up and down motion and for lateral or sweeping motion with respect to the die cavities or pockets 47, 48, and to other pockets 104, 105, the latter being provided in the sliding jaws 51, 52, for the reception of the tucking levers and their tucking blades in the out-of-service positions of these parts (see Figure 15). Said tucking levers 100, 101, are hung for up and down motion on horizontal pivots 106, 107, supported in short posts 109, 108, respectively, said posts being rockable or turnable in the table 30, so that the levers 100, 101, are movable vertically on the pivots 106, 107, and are movable laterally or horizontally by the turning movement of said posts 108, 109. The levers 100, 101, are normally drawn toward the pockets 104, 105, by tension springs 110 attached to said levers intermediate their ends and anchored at 110ª over the bed or table (see Figure 1). The up and down motion (rising and falling) of the levers 100, 101, is to effect their operation within the die cavities 47, 48, and within the pockets 104, 105, and the down motion is due to the tension of springs 111, 112, (Figure 11), whereas the up motion is positive under the action of a cam 113 on the drive shaft 33 (Figure 8). The springs 111, 112, are attached to the levers 100, 101, intermediate the ends thereof, pass downwardly through openings 114 provided in the bed or table and are anchored on the yoke 91ª (Figure 11). The cam 113 is provided with two high points 115, 116, with a dwell notch 117 and a neutral face 18 (Figure 8), whereby said neutral face 118 of the cam permits the levers to occupy pockets 104, 105, in the out-of-service positions of the tucking blades 102, 103, and their levers, whereas in the service of the levers and blades the high points 115, 116, give the rising and falling motions required in the pockets 47, 48, and 104, 105, while the dwell notch 117 renders the cam ineffective so far as concerns the rise and fall of the levers at the period when the levers are swung laterally. The rise and fall of the two levers 100, 101, from a single cam 113 is obtained by a rising and falling bar 119, positioned horizontally below the levers 100, 101, and extending transversely thereto so that the levers will be drawn downwardly and into contact with said bar by the tension of springs 111, 112. The bar is provided with a depending finger 120 which passes through and is guided in an opening 121 provided in the table or bed 30 (Figure 8). The lower end of finger 120 rests upon and rides on the peripheral portion of cam 113, and thus the high points 115, 116, of the cam give the up motion to the two levers 100, 101, simultaneously, whereas the springs 111, 112, give a down motion yieldingly to the levers and their tucking blades. The rising and falling bar 119 crosses beneath the folding lever 70 positioned intermediate the tucking levers 100, 101, and to permit the required motion of the lever 70 without hindrance from the bar 119, the latter is provided in its top edge with a notch 122 within which the lever 70 is free to move horizontally and vertically (see Figure 8).

The horizontal swinging motion of levers 100, 101, is imparted thereto simultaneously by a single cam 123 provided on drive shaft 33 (Figure 9), and acting through pivoted arms 124, 125, engageable with said levers 100, 101, to actuate the latter positively by overcoming the tension of springs 110. Said cam is provided at diametrically opposite sides thereof with high points 126, 126 and with neutral faces 127, 127, so related one to the other that the high points act simultaneously on the pivoted arms 124, 125, and the latter in turn press against the levers 100, 101, to swing the latter horizontally and toward each other in order to position the tucking blades 102, 103, over the die cavities 47, 48, the effect of which is to position said levers and blades into operative relations to the die cavities 47, 48. The arms 124, 125, are positioned vertically, and they extend through, and vibrate within, slots 128 provided in the table or bed 30, the upper ends of said arms contacting with the levers 100, 101, as shown in Figure 9. The arms are pivoted intermediate their ends by bolts 129 to a supporting plate or other member 130 fastened to the underside of the table by bolts 131, and at their lower ends said pivoted arms are provided with adjustable screws 132 which ride upon the peripheral surfaces 127 and the high points 126 of the cam 123 (Figure 9). The cams 113, 123, act in timed relation to each other and upon the levers 100, 101, in such manner as to first raise the ends of levers 100, 101, and their tucking blades 102, 103, out of the pockets 104, 105, then to swing the levers horizontally against the tension of springs 110 and over the die cavities 47, 48, then to lower the blades 102, 103, by the action of springs 111, 112, into the die-cavities 47, 48, then to raise the levers 100, 101, and blades 102, 103, positively, then to effect the return swinging motion from the die cavities 47, 48, toward and over the pockets 104, 105, and finally to lower the free ends of said levers and the blades 102, 103, into the pockets 104, 105, respectively, all of which movements are performed automatically, rapidly and in the described sequence. The effect of the described sequence of operations is to force the blades 102, 103, upon the pieces of material and to fold the same within the channels of parts A, A, occupying the die cavities 47, 48, and thus the wrapping or encasing portions of the pieces of fabric are tensioned and drawn taut around the channeled parts A, A.

Figure 15:
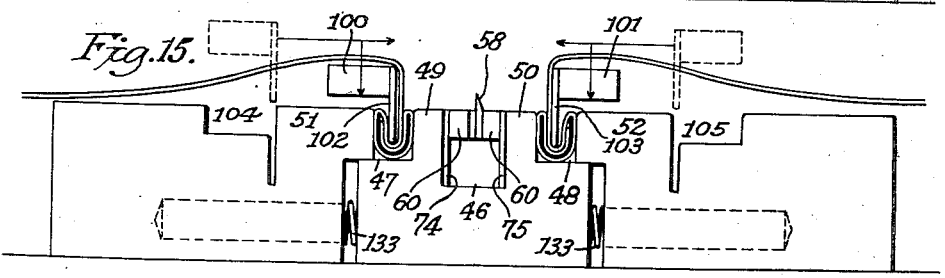

It should be mentioned that the blades 102, 103, are composed of relatively thin pieces of metal, usually steel, attached fixedly to the levers 100, 101, so as to depend therefrom (Figures 5 and 15), whereby the blades are adapted to operate with precision and with marked efficiency within the narrow channels of the small parts A, A, for tucking therein the relatively thin pieces of fabric, all as graphically depicted in Figure 15.

Figure 16:
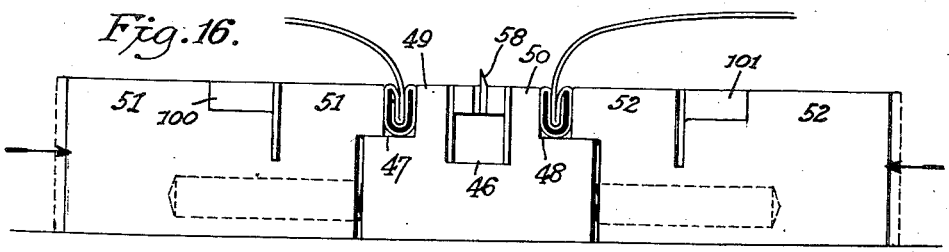

The next operation performed upon the assembled materials A, B, is that of compressing the channeled metal parts A, A, relatively to the encasing and tucked in fibrous pieces of material B, and to this end means are provided for reducing the lateral dimensions of the die cavities 47, 48, by imparting motion to the sliding jaws 51, 52, with reference to the fixed jaws 49, 50 (Figures 10 and 16). The jaws 51, 52, are normally pressed outwardly with respect to the fixed jaws 49, 50, by the tension of springs 133 seated in sockets 134 provided in the sliding jaws (see dotted lines in Figures 12 to 16, inclusive). For effecting the inward closing movement of said jaws 51, 52, with the power required for closing the channeled metal parts A, A, upon the infolded and encasing materials B, we provide positively-acting means in the form of levers 134, 135, and a cam 136, the latter being fast with the drive shaft 33 (Figure 10). Said cam is provided with high points 137, 137, and with neutral faces 138 (Figures 10 and 10ª), and upon the peripheral surfaces of said cam ride the adjusting screws 139 mounted in the die-closing levers 134, 135. Said levers are positioned vertically to operate at the respective sides of the table or bed, with their upper ends engageable with the outer end edges of the slidable die jaws 51, 52. Each lever 134, 135, is pivoted intermediate its ends by a bolt 140 on a bracket 141 attached to the underside of the table or bed, said lever being bent as shown in Figure 10 for its screw-carrying end to have the required relation to the cam 136. In the rotation of the cam 136, the high points 137 press against the adjusting screws 139 to actuate the levers 134, 135, simultaneously, forcing the upper ends of the levers inwardly and move the sliding jaws 51, 52, inward against the pressure of their impelling springs 133, the effect of which is to reduce the transverse width of the die cavities 47, 48, to compress the metal parts A, A, between the fixed jaws 49, 50, and movable jaws 51, 52, and to thus close the metal parts A, A, upon the infolded portions of the fibrous materials B, whereby the metal parts and the fibrous materials are inseparably attached by the gripping action of the metal parts, and at the same time the metal parts are encased within the wrapping portions of the fibrous materials, and said wrapping and encasing materials are tightly drawn around the metal parts for the length of said metal parts, resulting in a compact wrapped tip or stiffened end, the utility of which is that said tip serves the functions (a) of a bodkin in threading the fibrous material through an eyelet or other opening, and (b), of a locking and retaining means for precluding the accidental separation of the fibrous material from the eyelet or other member, the two parts, i. e., the eyelet and the stiffened tip constituting for all practical purposes a separable connection or fastener.

The operation will be readily understood from the foregoing description, but it may be summarized briefly as follows:—With the lever 61 in the out-of-service position of Figure 1, the attendant assembles the metal parts and the fibrous material by placing the metal parts A, A, upon the retainers 67, 68, and draws the fibrous material B from the reel b as to lay a length of said material across the die cavities 47, 48, and the cutter member 58, the length of said material being determined by the gage 57, Figure 2. The operator now swings the lever 61 upwardly, forwardly and downwardly in order that the cutter 59 will coact with the cutter member 58 to sever the fibrous material into two pieces of determined length (Figure 12) one of which pieces remains unitary with the material wound on the reel. At the same movement of lever 61 the two metal parts A, A, held on said lever are pressed downwardly upon the proximate severed ends of the pieces of fibrous material and are entered within the die cavities 47, 48 (Figure 12). The clutch is now operated to set in motion the automatic mechanisms of the machine, and the following operations are sequentially performed: Lever 70 is raised out of recess 46, swung horizontally to position over recess 48 to sweep an end of the material over the member A in pocket 48, then depressed for its blade 75 to fold said end of the material into the channel of part A in said pocket 48 (Figure 13); then raised out of pocket 48; then shifted from place above pocket 48 over to place above pocket 46 to sweep one end of the material over said pocket 46 and over the part A occupying said pocket 46, then lever 70 is again depressed for its blade 74 to fold said end of material B into the channel of part A within said pocket, then the lever 70 is again raised to withdraw blade 74 from the pocket 46, and finally the lever 70 is shifted horizontally to place over recess 46 and it is then lowered with its blades 74, 75, to occupy the out-of-service position in said recess 46. Next, the levers 100, 101, are raised with respect to pockets 104, 105, moved toward each other for the blades to be in alinement vertically with the channeled members A, A, within the pockets 47, 48, then the levers are depressed for the blades 102, 103, to tuck the material into the channels of members A, A, and within the folded ends of said fibrous materials previously folded therein, then the levers 100, 101, are raised to withdraw blades 102, 103, out of pockets 47, 48, then the levers 100, 101, are shifted horizontally over pockets 104, 105, and then the levers are lowered for the blades 102, 103, to be housed within the pockets 104, 105, respectively. Next, the jaws 51, 52, are forced inwardly by the cam and the levers for applying such pressure upon the members A, A, as to compress said members for closing the same and permanently uniting the metal parts and the fibrous materials, after which the springs 133 press back the slidable jaws 51, 52, and the fibrous materials with the channeled parts attached are removed from the pockets 47, 48, thus completing the operations. The assembly of materials and the foregoing operations are repeated for the union of metal parts and fibrous materials to produce articles of the classes described, wherein the metal parts are so united as to prevent unraveling of the fibrous materials at their ends, and to provide stiffened tips performing the function of a threader or bodkin when inserting the fabric into or removing it from an eyelet of one form or another, and of a fastener to preclude accidental separation of the fibrous material from the eyeleted garment or other article.

A simplified form of the tip-attaching mechanism is illustrated in Figures 19 to 23, inclusive, wherein a single die cavity or pocket 143 is used in connection with a fixed jaw 144 and a movable jaw 145 operable for compressing a channeled metal part A upon a length of fibrous material, the end $b^{10}$ of which is folded over and into the channel of said part A by a movable blade 146. The jaw 145 is slidable with respect to jaw 144, the jaws are normally opened, as in Figures 19, 20, 21 and 22, by the action of a spring 147 on jaw 145, and suitable means, such as a lever 159 (Figure 23), is provided, whereby the operator may apply force to the jaw 145 for closing the metal part A upon the fibrous part B. A gage 148 is employed, preferably over the fixed jaw, for aiding the operator to determine the length of that part of the fibrous material required for encasing the metal part, and below this gage slides the folding blade 146, the latter being withdrawn from position over pocket 143 by a spring 149, housed in a recess 150 of jaw 144 and applying pressure to a stud 151 attached to and pendant from the blade 146, said stud being movable in a slot 152 provided in the jaw 144 (Figure 19). The end of the slidable folding blade 146 projects beyond one end of jaw 144, and to it is pivoted at 153 one arm of a bell-crank lever 154, the latter being pivoted at 155 to a fixed plate 156 on the jaw 144, said lever being operated in a desirable way through a link 157 pivoted at 158 to the other end of said lever (Figure 19).

The assembly of materials is performed manually, and with the jaws opened, the operator first places a piece of fibrous material B across the jaws and the die cavity or pocket 143, with the end of said material in contact with the stop or gage 148. A metal part A is now placed upon the fibrous material, and the metal part and the fibrous material are now forced by hand downwardly into the pocket, the effect of which is to withdraw the end of the material B from the gage, see Figure 20, and to fold said material around the metal part, the parts A, B, being now within the pocket 143 with the fibrous material partly encasing the channeled part exteriorly of the latter. The blade 146 is now moved across the pocket, the effect of which is to fold the end $b^{10}$ of the fibrous material over the channeled part A and the pocket 143 whereupon the fibrous material is lifted by hand and folded from the position over jaw 145 (Figure 20) to the full line position shown in Figure 21, so that the fibrous material is itself moved across the pocket 143 and over the partly folded end $b^{10}$ (Figure 21). Thereafter a tucking blade or plunger 160 (Figures 21, 22) is lowered upon the fibrous material, the effect of which is two-fold, first, the end $b^{10}$ of the fibrous material is tucked into the channel of the metal part (Figure 22), and the material B is itself folded or doubled at $b^{11}$ (Figure 22), and such folded or doubled material is thrust into the channel of the metal part A (Figure 22), whereby an ample quantity of the fibrous material is thrust or inserted into the channel of the metal part to effect a safe and permanent attachment of the fibrous material and the metal part. The plunger or tucking blade 160 is now withdrawn, and thereafter lever 159 is operated to advance the movable jaw 145 toward the fixed jaw 144, and to compress the metal part A upon the inserted and tucked portions of the fibrous material (Figure 23), whereupon the jaw 145 is withdrawn from its co-operative relation to the fixed jaw, thus freeing the jaws and completing the operation, the article being removed by hand.

While certain of the claims define a fastener making machine, it is to be expressly understood that the device is adapted to unite fabric or fibrous materials and metal or compressible materials so as to provide stiffened portions or ends on fabric materials. Applicants are entitled to all the uses to which their invention may be put, and the claims are not to be construed as being limited to making fasteners only.

Having thus fully described the invention, what we claim as new and desire to secure by Letters Patent is:

1. In a machine for uniting fibrous and metal materials of substantially the class described, a compression die having relatively movable members constituting a cavity for the reception of a channeled part and a portion of the fibrous material, and means operable for infolding a part of the fibrous material within said channeled part and for encasing said channeled part exteriorly with said fibrous part, said compression die being operable for compressing said channeled part and to effect the union of the metal part and the fibrous part whereby the metal part is encased within the fibrous part.

2. In a machine for uniting fibrous and metal materials of substantially the class described, a compression die provided with a cavity, and a fabric tucking and folding mechanism movable relatively to said cavity, for tucking a fibrous material into the channeled member adapted with said fibrous material to be deposited within said cavity prior to the operation of said die means for operating the die to compress the channelled member and clamp the infolded fibrous material for effecting a permanent union between the fibrous material and said channelled member.

3. In a machine for uniting fibrous and metal materials of substantially the class described, a closing die provided with a cavity, means for assembling a metal part and a fibrous material relatively to said die cavity, means for folding and tucking a portion of said fibrous material for encasing the metal part within said fibrous material and to infold a portion of the fibrous material within the metal part, and means for operating said closing die, whereby the assembled metal part and the fibrous material are united by the action of said closing die.

4. In a machine for uniting fibrous and metal materials of substantially the class described, a die member having a die-cavity, means for depositing within said die cavity a channeled metal part and a fibrous material to partly encase said metal part, means for folding and tucking a portion of the fibrous material within the channel of the metal part, and means for closing said metal part upon the infolded fibrous material.

5. In a machine for uniting fibrous and metal materials of substantially the class described, die members having a die cavity, means for depositing therein a metal part and a fibrous material to exteriorly envelop said metal part, means for infolding a portion of the fibrous material relatively to said metal part, and means for compressing the metal part and thereby unite the fibrous material and the metal part.

6. In a machine for uniting fibrous and metal materials of substantially the class described, a plurality of die members having relative movement and producing a cavity, means for opening and closing said die members, means for positioning a fibrous material across the die cavity, means for positioning a channeled metal part upon said fibrous material and operable for concurrently depositing the metal part and the fibrous material within the die cavity, and means for tucking a portion of the fibrous material into the channeled metal part prior to the closing movement of the die members.

7. In a machine for uniting fibrous and metal materials of substantially the class described, a plurality of relatively movable die members forming a die cavity, spring mechanism for opening said die members, means for positively operating said die members for closing the same, means for depositing a channeled metal part within the die cavity, means for positioning a fibrous material in the path of the metal part prior to its movement into the die cavity, and means for tucking a part of the fibrous material within the channel of said metal part.

8. In a machine for uniting fibrous and metal materials of substantially the class described, the combination with a die having a cavity into which is adapted to be deposited a metal part and a fibrous material, of a tucking or folding mechanism operable on a portion of said fibrous material for infolding the latter with respect to said metal part, said die being closable subsequently to the action of said tucking or folding mechanism.

9. In the art of producing a stiffened ended fibrous material substantially of the character described, the method which comprises assembling a channeled metal part relatively to a flexible fibrous material by imposing said metal part upon the fibrous material, depositing the assembled metal part and the fibrous material into a cavity for the fibrous material to encase the metal part, tucking a portion of the flexible material within said channel of the metal part, and closing said metal part upon the infolded fibrous material.

10. In the art of producing a stiffened ended fibrous material substantially of the character described, the method which comprises imposing a channeled part upon a flexible material, depositing the assembled part and flexible material within a cavity whereby the flexible material envelopes the channeled part exteriorly, folding and tucking a portion of said flexible material within the channel of said part, and closing the channeled part upon the infolded material.

11. In the art of producing a stiffened ended fibrous material substantially of the character described, the method which comprises imposing a channeled part upon a fibrous material, depositing the part assembled with the fibrous material within a cavity for a portion of said fibrous material to exteriorly encase the channeled part, folding a portion of the fibrous material and thrusting the folded portion within said channel and concurrently therewith tensioning the exterior encasing portion of said fibrous material, and closing said channeled part upon the infolded material.

12. In the art of producing a stiffened ended fibrous material substantially of the character described, the method which comprises imposing a channeled part upon a fibrous material, depositing the part assembled with the fibrous material within a cavity for a portion of said fibrous material to exteriorly encase the channeled part, tucking the free end of said fibrous material within said channel, folding a portion of the fibrous material and thrusting said folded material within said channel, and closing the channeled member upon the tucked in free end and upon the infolded portions of said fibrous material.

13. In a fastener making machine, the combination with a die provided with a cavity adapted for the reception of the components of a fastener, of means for depositing a channeled metal part within said die cavity, means for positioning a flexible material in the path of said channeled metal part, a folding member mounted for movement relatively to said die cavity, and mechanism for shifting said folding member by imparting a traversing motion thereto across the die cavity together with a motion inwardly and outwardly with reference to the die cavity, said folding member operating upon the flexible material for infolding said material within the channeled metal part.

14. In a fastener making machine, the combination with a die provided with a cavity, of means for depositing a channeled metal part within said die cavity, means for positioning a flexible material in the path of the channeled metal part for entry therewith into said die cavity, a folding lever provided with a folding blade, of means for moving said lever and blade toward and from said die cavity whereby the blade is effective in folding a portion of the flexible material within the channel of said metal part, and means for moving said blade inwardly of and outwardly from said die cavity.

15. In a fastener making machine, the combination with a plurality of dies provided with cavities, of a folding lever provided with a plurality of folding blades, and means for actuating said folding lever to position said folding blades in active relation to said plurality of die cavities.

16. In a fastener making machine, the combination with a plurality of dies provided with cavities, of a folding lever provided with a plurality of folding blades, and actuating means including cams whereby a single folding lever is controllably operated for service in connection with said plurality of die cavities.

17. In a fastener making machine, the combination with a plurality of dies provided with cavities, of a folding lever normally in an out-of-service position with respect to said die cavities, means for shifting said lever over said die cavities successively and for returning said lever to said out-of-service position, and additional means for moving said lever into and out of said die cavities successively.

18. In a fastener making machine, the combination with a plurality of dies provided with cavities, of a lever provided with a plurality of folding blades, and means for imparting a compound motion to said folding lever whereby the folding blades are operable within the die cavities successively.

19. In a fastener making machine, the combination with a plurality of dies provided with cavities, of folding means operable for effecting the insertion of a plurality of fabric ends within the channels of a plurality of metal parts adapted to occupy said cavities, and tucking means operable for tucking the fabrics within said channels of said metal parts.

20. In a fastener making machine, the combination with a plurality of dies provided with cavities adapted for the reception of a plurality of channeled metal parts, of folding means for inserting the ends of a plurality of fabrics within said channels of the metal parts and subsequently operable tucking means for tucking other portions of said fabrics within said channels of the metal parts.

21. In a fastener making machine, the combination with a plurality of dies provided with cavities adapted for the reception of a plurality of channeled metal parts, of a single folding lever co-operable with said die cavities alternating for folding within said metal parts the end portions of a plurality of fibrous materials, and tucking means actuated for tucking within said channeled parts other portions of said fibrous materials.

22. In a fastener making machine, the combination with a plurality of dies provided with cavities adapted for the reception of a plurality of channeled metal parts, of a plurality of mechanisms co-operable with said die cavities for folding and tucking within said channeled parts certain portions of a plurality of fibrous materials.

23. In a fastener making machine, the combination with a plurality of dies provided with cavities adapted for the reception of a plurality of channeled metal parts, of a plurality of mechanisms co-operable with said die cavities for folding and tucking within said channeled parts certain portions of a plurality of fibrous materials, and means for closing said channeled parts upon the tucked portions of said fibrous materials.

24. In a machine of the kind specified, the combination with a die provided with a cavity, of an assembly lever member provided with means for retaining a fastener member and operable for depositing said fastener member within said die cavity, means for folding a fibrous material within the fastener member, and means for closing said fastener member upon said folded fibrous material.

25. In a machine of the kind specified, the combination with a die provided with a cavity, of means for determining the position of a fibrous material relatively to said die cavity, an assembly lever having a retainer for a fastener member, said assembly lever being operable for imposing the fastener member upon said fibrous material, means for tucking the fibrous material within the fastener member, and means for closing the fastener member upon said tucked portion of the fibrous material.

26. In a machine of the kind specified, the combination with a die provided with a cavity, of assembly means whereby a channeled part and a fibrous material are positioned within said die cavity, means for infolding the fibrous material within the channeled part, and means for closing said channeled part upon said infolded fibrous material.

27. In a machine of the kind specified, the combination with a die provided with a cavity, of assembly means for a channeled part and a fibrous material whereby the same are positioned within the die cavity for the fibrous material to partly encase the channeled part, folding means for infolding a portion of said fibrous material within the channeled part, and means for closing said channeled part upon said infolded material.

28. In a machine of the kind specified, the combination with a die provided with a cavity, of an assembly member operable for positioning a channeled part within said die cavity, cutter mechanism operable for severing a length of fibrous material in co-operative relation to said die cavity, means for infolding a portion of said severed fibrous material relatively to the channeled part and to the die cavity, and means for uniting the assembled channeled part and the infolded portion of the fibrous material.

29. In a machine of the kind specified, the combination with a die provided with a cavity, of means for determining the relation of a fibrous material to said die cavity, an assembly member for imposing a channeled part upon said fibrous material and for depositing the channeled part with a portion of the fibrous material within said die cavity, cutting means for severing the fibrous material, means for infolding a portion of the fibrous material within the channeled part, and means for closing the channeled part upon said infolded material.

30. In a machine of the kind specified, the combination with a die provided with a cavity, of assembly means for depositing within said die cavity a metallic part and a fibrous material constituting the components of an article substantially of the class specified, means for infolding a portion of the fibrous material relatively to the metallic part subsequently to such assembly of the components and means for effecting the union of said components subsequently to the infolding of one component relatively to the other component.

31. In a machine of the kind specified, the combination with a die provided with a cavity, of assembly means for depositing within said die cavity a metallic part and a fibrous material constituting the components of an article substantially of the class specified, cutting means for said fibrous material, means for infolding the fibrous material relatively to said metallic part, and means for closing said metallic part upon the infolded fibrous material.

32. In a machine of the kind specified, the combination with a die provided with a cavity, of assembly means for a metallic part and a fibrous material constituting the components of an article substantially such as specified, folding means for inserting a portion of the fibrous material in encasing relation to the metal part, and means for closing the metal part upon said inserted portion of the fibrous material.

33. In a machine of the kind specified, the combination with a die provided with a cavity, of assembly means for a metallic part and a fibrous material constituting the components of an article substantially as specified, a folding member provided with a blade operable within said cavity for infolding a portion of said fibrous material relatively to the metal part, tucking means provided with a blade operable for tucking another portion of the fibrous material relatively to said metal part, and means for closing the metal part upon the folded and tucked portions of the fibrous material.

34. In a machine of the kind specified, the combination with a plurality of dies provided with cavities, of means for positioning a fibrous material relatively to said cavities, means for severing said fibrous material, means for infolding a portion of said severed fibrous materials within the die cavities, means for depositing metal parts within said die cavities, and means for closing said metal parts upon the infolded portions of the fibrous materials.

35. In a machine of the kind specified, the combination with a plurality of dies provided with cavities, of means for positioning a fibrous material relatively to said cavities, assembly means for depositing channeled parts within said die cavities, for the fibrous materials to partly encase the channeled parts, a folding member operable alternately in said cavities for infolding the end portions of the fibrous materials with said channeled parts, a plurality of tucking devices for infolding other portions of the fibrous materials within the channeled parts, and means for closing said channeled parts upon the infolded and tucked portions of said fibrous materials.

36. In a machine of the kind specified, the combination with a plurality of dies provided with cavities, of means for positioning a fibrous material relatively to said cavities, assembly means for depositing channeled parts within said die cavities, fabric folding means co-operable with said die cavities, tucking means also co-operable with said die cavities, compressing means for effecting the union of the channeled parts and the fibrous materials, and actuating means for imparting motion to said folding, tucking and compressing mechanisms in a determined sequence.

37. In a machine of the kind specified, the combination with a plurality of dies provided with cavities, of assembly means for fibrous materials and for channeled parts, a folding member co-operable with said plurality of die cavities, actuating means for said folding member, a plurality of tucking means co-operable individually with said die cavities, actuating means for said tucking means, compressing means, and actuating means for said compressing means, said actuating means operating in a determined sequence for effecting the required cycle of operations for said folding, tucking and compressing means.

38. In a machine of the class specified, the combination with a plurality of dies provided with cavities, of a single folding member, having a plurality of folding blades, and cam mechanism operable for imparting a compound motion to said folding member whereby the blades thereof are shifted relatively to said die cavities and said blades are operable alternately within said plurality of die cavities.

39. In a machine of the class specified, the combination with a plurality of dies provided with cavities, and means for infolding fibrous materials within said die cavities, of a plurality of tucking members provided with blades operable individually within said die cavities, and cam actuated means for imparting motion simultaneously to said tucking members.

40. In a machine of the class specified, the combination with a plurality of dies provided with cavities, and means for positioning channeled parts and fibrous materials within said die cavities, of a plurality of jaws constituting the die cavities, and cam means for imparting motion to said jaws for closing the channeled parts upon the fibrous materials to effect a permanent union thereof.

41. In a machine of the character described, the combination of dies provided with cavities, means for positioning a flexible material adjacent said cavities, means for severing said flexible material, means for depositing channeled members on the flexible material and forcing portions of the flexible material into the cavities, means for infolding portions of said severed flexible material within the channeled members, and means for compressing the channeled members so as to clamp the infolded portions of the flexible material.

42. In a machine of the class described, the combination of a plurality of dies formed with stationary parts and movable parts so as to form cavities therebetween, means for positioning a flexible material over said cavities, means for depositing compressible members in the cavities, means for infolding portions of said flexible material within the compressible members, and means for moving the movable parts of the dies so as to clamp the infolded portions of the flexible material within the compressible members.

43. In an apparatus of the character described, the combination of a die provided with a cavity, means for positioning a flexible material adjacent said cavity, means for simultaneously severing said flexible material and depositing a channeled member on a portion of the flexible material so as to force the flexible material into the cavity, means for infolding portions of said flexible material within the channeled member, and means for compressing the channeled member so as to clamp the infolded portions of the flexible material.

44. In an apparatus of the character described, the combination with a plurality of spaced dies, of means for positioning a flexible material across the spaced dies, means for inserting channeled parts into the space between the dies so as to force the flexible material into the spaces between the dies, a folding member for infolding the end portions of the flexible material within said channeled parts, a plurality of tucking devices for infolding other portions of the flexible material within the channeled parts, and means for closing said dies so as to compress the channeled parts upon the infolded and tucked portions of said flexible material.

45. In a fastener making machine, a plurality of dies with die cavities, a folding lever provided with a plurality of folding blades, a single bladed folding lever, and means including cam members for operating said folding levers to infold portions of a flexible material within a channeled part.

46. In a fastener making machine, a plurality of dies provided with die cavities, a folding lever provided with a plurality of folding blades, a single bladed folding lever, and means including cam members for operating said folding levers to infold portions of a flexible material within a channeled part, and means for operating said dies for closing said channeled part on said infolded portions.

47. In a fastener making machine, a plurality of dies provided with die cavities, a folding lever provided with a plurality of folding blades, and means including a cam member and a spring for operating said folding lever to infold a portion of a flexible material within a channeled part.

48. In a fastener making machine, the combination with a plurality of dies provided with cavities adapted for the reception of a plurality of channeled metal parts, of a plurality of resiliently mounted levers for inserting the ends of a plurality of fabrics within said channeled metal parts, and for folding other portions of said fabrics within said channeled metal parts.

49. In a machine for uniting fabric and compressible materials of substantially the class described, the combination with a die having a cavity into which is adapted to be deposited a compressible part and a fabric material, of a folding member operable on a portion of the fabric material for infolding the latter with respect to said metal compressible part, a plurality of springs attached to the folding member, and means for closing said die to inseparably unite the fabric and compressible part.

50. In a fastener making machine, the combination with a plurality of dies provided with cavities, of a folding lever provided with a plurality of folding blades, and means including a spring and a cam member for actuating said folding lever to position said folding blades in active relation to said plurality of die cavities.

51. In a fastener making machine, the combination with a plurality of dies having die cavities, of a folding lever provided with a folding blade and means for actuating said folding lever to position said folding blade in active relation to said plurality of die cavities, and means for closing said dies.

52. In a fastener making machine for uniting flexible material and metal parts, the combination with a plurality of dies provided with cavities, a folding lever for tucking and folding portions of flexible material within the metal parts in said cavities, a knife on said folding lever for severing flexible material, and means for actuating said folding lever.

53. In a fastener making machine for uniting fabrics and compressible metal parts, the combination with a plurality of dies provided with cavities, of a folding lever provided with a plurality of folding blades adapted to fold portions of the fabric within compressible metal parts, a plurality of knives on said folding lever for severing fabrics, and means for actuating said folding lever to position said folding blades in active relation to said plurality of die cavities.

54. In a fastener making machine, the combination with a plurality of dies provided with cavities, of a folding lever provided with a plurality of folding blades, a plurality of knives on said folding lever, one of said knives being resiliently mounted, and means for actuating said folding lever to position said folding blades in active relation to said plurality of die cavities.

55. In a fastener making machine for uniting flexible material to metal parts, the combination of a frame, a shaft mounted in said frame, a cam member on said shaft, a folding lever pivotally mounted on said frame for folding in portions of the flexible material within a channeled metal part, and means associated with said cam member and said lever for operating said lever.

56. In a fastener making machine for uniting flexible materials to metal parts, the combination of a frame, a rotatable cam member mounted in said frame, a folding lever pivotally mounted on said frame for folding and tucking in portions of the flexible material within a channeled metal part, means for resiliently connecting said lever to said frame, and means contacting said cam member for operating said folding lever.

57. In a fastener making machine for uniting flexible materials to metal parts, the combination of a frame, a shaft mounted in said frame, cam members on said shaft, a plurality of levers pivotally mounted on said frame and adapted to tuck in and fold portions of the flexible material within channeled metal parts, one of said levers having a plurality of folding blades, and means associated with said cam members and said levers for operating said levers.

58. In a fastener making machine for uniting flexible materials to metal parts, the combination of a frame, a rotatable cam member mounted in said frame, a lever pivotally mounted on said frame and adapted to fold in portions of the flexible material within channeled members, a plurality of springs for connecting said lever to said frame, and means contacting said cam member for operating said lever.

59. In a fastener making machine for attaching a metal part to a fabric, the combination of a frame, a shaft mounted in said frame, a plurality of dies provided with a plurality of cavities, a plurality of levers pivotally mounted on said frame and adapted to fold in portions of the fabric within channeled members, and means including cam members on said shaft for operating said dies and said levers.

60. The method of attaching a metal part to a fabric or the like, which comprises positioning a fabric over a plurality of cavities, simultaneously severing said fabric and depositing a plurality of channeled members in the cavities so as to force the fabric into the cavities, folding a portion of the fabric into one of the channeled members, and then folding a portion of the fabric into another of said channeled members, and then compressing the channeled members so as to grip the fabric.

61. The method of attaching a metal part to a fabric or the like, which comprises tucking a portion of the fabric into one channeled member, tucking a portion of the fabric into another channeled member, folding a portion of the fabric into the first-mentioned channeled member, folding a portion of the fabric into the second-mentioned channeled member, and finally closing said channeled members on said tucked-in and folded-in portions.

62. In a machine for making fasteners, a die member having a die cavity, means for positioning a flexible material across said die cavity, means for depositing a channeled member on said flexible material, and forcing the flexible material into the die cavity, means for folding and tucking a portion of the flexible material within the channeled member, and means for closing said channeled member on the infolded flexible material.

63. In an apparatus of the class described, the combination of a die provided with a cavity, means for positioning a flexible material adjacent said cavity, means for depositing a channeled member on a portion of the flexible material so as to force the flexible material into the cavity, means for cutting said flexible material, means for infolding portions of the flexible material within the channeled member and means for compressing the channeled member so as to clamp the infolded portions of the flexible material.

64. In a fastener making machine, the combination with a die provided with a cavity adapted for receiving a channeled metal part, of a resiliently mounted lever, means for operating said lever for inserting the end of a fabric material within the channeled metal part and for folding other portions of the fabric material within the channeled metal part.

65. In a fastener making machine, the combination with a die provided with a cavity adapted for receiving a channeled metal part, of a resiliently mounted lever, means for operating said lever for inserting the end of a fabric material within the channeled metal part and for folding other portions of the fabric material within the channeled metal part, said means including cam mechanisms.

66. In a machine for uniting fibrous and metal materials of substantially the class described, die members having a die cavity, means for depositing therein a channeled part and a fibrous material, means for inserting and infolding portions of the fibrous material into the channeled part, and means for compressing the channeled part to unite the fibrous material and the channeled part.

67. The method of producing fastening devices of substantially the class described, which comprises, positioning a channeled part upon a fibrous material, depositing the part assembled with the fibrous material within a cavity for a portion of the fibrous material to exteriorly encase a portion of the channeled part and concurrently therewith tensioning the exterior encasing portion of the fibrous material, folding a portion of the fibrous material into the channeled part, and then compressing the channeled part so as to grip the fibrous material and form a stiffened end on the fibrous material.

In testimony whereof we have hereunto signed our names this 29th day of August, 1927.

BEN HOWE.
EDWARD KUNZELMAN.

(OVER)

CERTIFICATE OF CORRECTION.

Patent No. 1,844,092.                          Granted February 9, 1932, to

BEN HOWE ET AL.

It is hereby certified that error appears in the printed specification of the above numbered patent requiring correction as follows: Page 4, line 24, for "of" second occurrence read at; page 7, line 25, for the numeral "18" read 118; page 8, line 73, after "reel b" insert the word so; page 9, lines 127 and 128, claim 1, for "metal" read channeled; page 14, line 11, claim 49, strike out the word "metal"; and that the said Letters Patent should be read with these corrections therein that the same may conform to the record of the case in the Patent Office.

Signed and sealed this 29th day of March, A. D. 1932.

(Seal)                                                           M. J. Moore,
                                                                     Acting Commissioner of Patents.